United States Patent [19]

Kim

[11] Patent Number: 5,004,290
[45] Date of Patent: Apr. 2, 1991

[54] SUN BLIND FOR USE IN AUTOMOBILE

[76] Inventor: Youngchol Kim, Sajic Royal Apt. 2 cha, 1-208, 632-4, Sajic, 2-dong, Rep. of Korea

[21] Appl. No.: 416,602

[22] Filed: Oct. 3, 1989

[30] Foreign Application Priority Data

Oct. 7, 1988 [KR] Rep. of Korea .......................... 16622

[51] Int. Cl.⁵ ................................................ B60J 1/20
[52] U.S. Cl. .................................. 296/99.1; 296/95.1
[58] Field of Search ..................... 296/95.1, 136, 99.1; 160/370.2

[56] References Cited

U.S. PATENT DOCUMENTS 4,229,035 10/1980 Newman .............................. 296/95.1
4,848,827 7/1989 Ou ...................................... 296/95.1

FOREIGN PATENT DOCUMENTS 1530699 11/1978 United Kingdom .

Primary Examiner—Robert R. Song
Attorney, Agent, or Firm—Notaro & Michalos

[57] ABSTRACT

A sun blind for use on automobiles comprises a pair of side panels which are driven to the sides of a base mounted on the roof of an automobile, and a pair of end panels which are driven to the front and rear of the base. A pair of corner panels are provided for each panel and are interconnected by rollers and grooves for moving at acute angles outwardly of the corners of the base when the side and end panels are moved outwardly.

5 Claims, 17 Drawing Sheets

SUN BLIND FOR USE IN AUTOMOBILE

FIELD AND BACKGROUND OF THE INVENTION

The present invention relates in general to sun blinds and in particular to sun blinds for use in automobiles.

Sun blinds are known but are usually thick in structure, difficult to operate and heavy in construction. While such blinds include various panels, they cannot be operated individually and are inconvenient to use. They are also subjected to frequent damage and are thus not practical.

SUMMARY OF THE INVENTION

The present invention comprises a sun blind for use on the roof of an automobile. The blind includes a base having opposite sides at the left and right of the base, and opposite ends at the front and rear of the base. A middle frame is engaged over and connected to the base. A cover is engaged over the middle frame.

Main side panels which are guided for movement to the left and right sides of the blind are mounted between the base and the middle frame and main end panels are mounted for movement to the front and rear of the blind, between the middle frame and the cover. Four corner side panels are also mounted for movement between the base and the middle frame. Grooves are provided in the main side panels and in the middle frame for guiding movement of the corner side panels at acute angles and outwardly from the corners of the blind. Four similarly constructed and mounted corner end panels are engaged between the middle frame and the cover for outward movement beyond the corners of the blind.

DESCRIPTION OF THE PREFERRED EMBODIMENT

Figure 1:
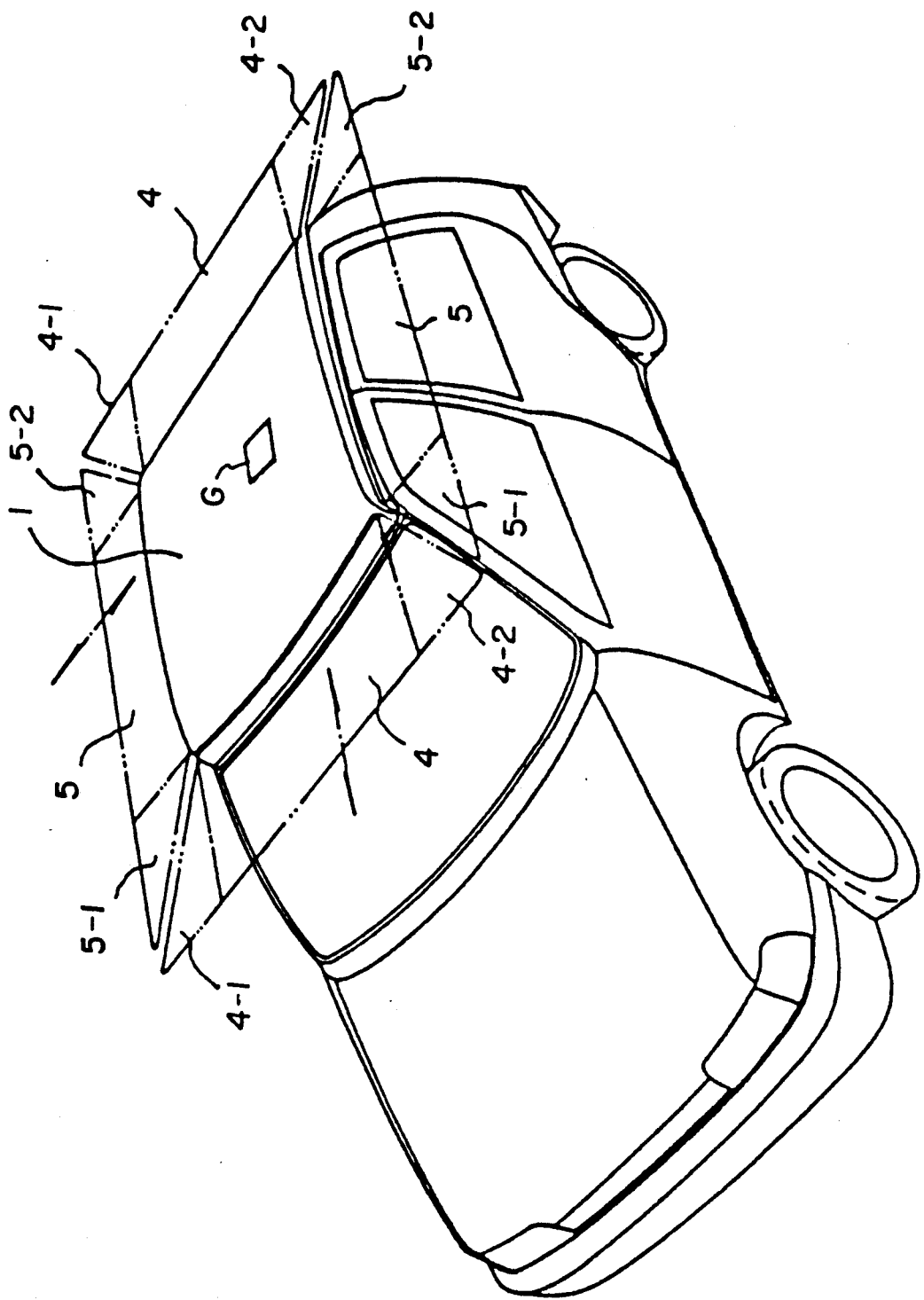
FIG. 1 is a schematic perspective view of the sun blind of the invention shown mounted on an automobile in a position with all panels fully extended.

Referring to the drawings in particular, the invention embodied in FIG. 1 comprises a sun blind for the roof of an automobile which comprises a base and middle frame (not shown in FIG. 1) which are covered by a cover 1. Substantially rectangular front and rear main end panels 4 are driven by drive means G in an end direction to the front and to the rear of cover 1. Drive means G are also connected to a pair of rectangular main side panels 5 which can be driven in a side direction outwardly beyond the respective sides of cover 1.

Figure 2:
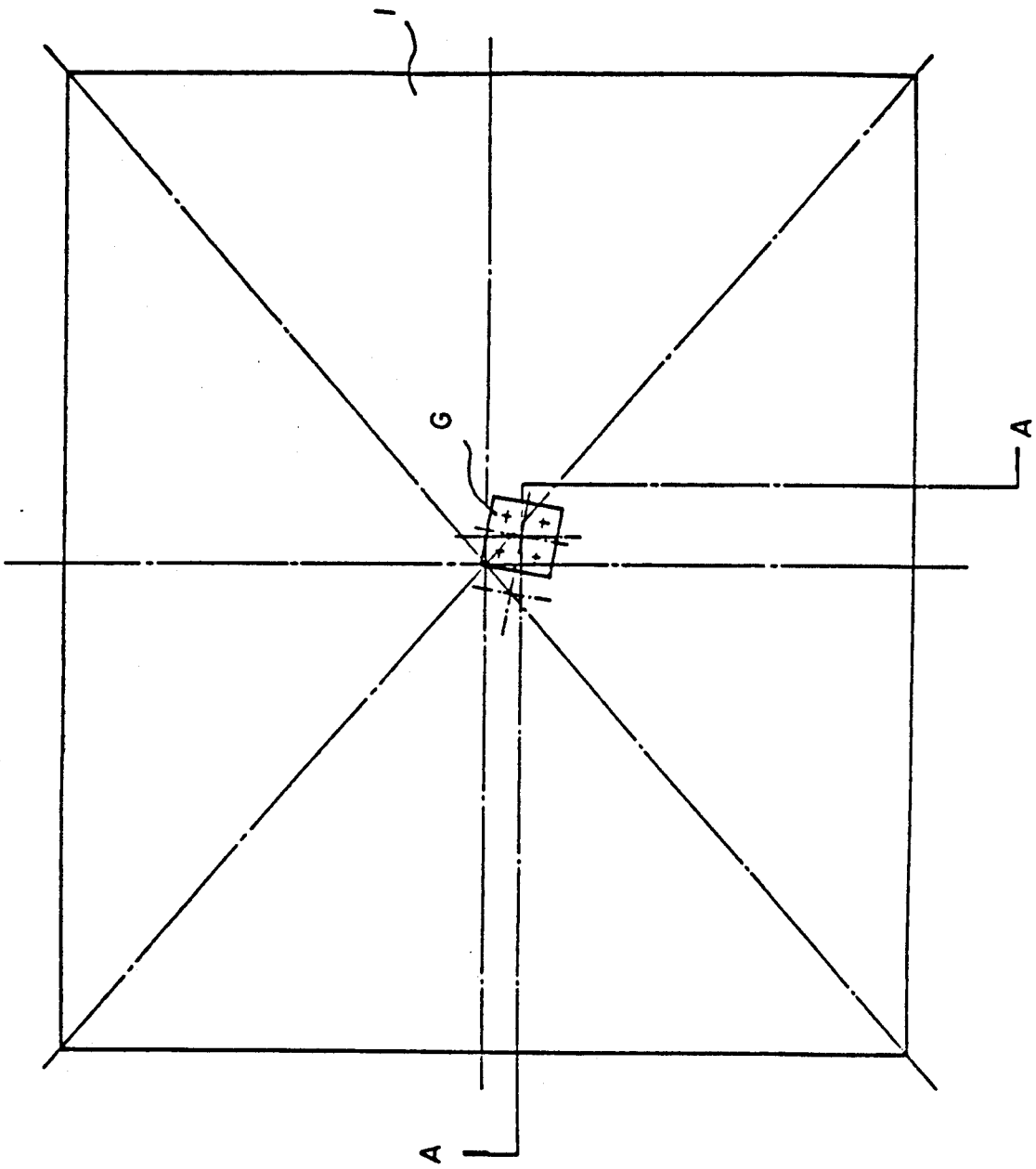
FIG. 2 is a schematic top plan view of the sun blind with all panels retracted.

In addition, four corner end panels 4-1 and 4-2 and four corner side panels 5-1 and 5-2 are connected to drive means for driving these corner panels at acute angles outwardly beyond the corners of the cover 1 to provide a large rectangular sun blind for the automobile. In FIG. 1 the phantom lines show the fully extended position for all panels. Drive G is also shown near the center of cover 1 in FIG. 2.

Figure 3:
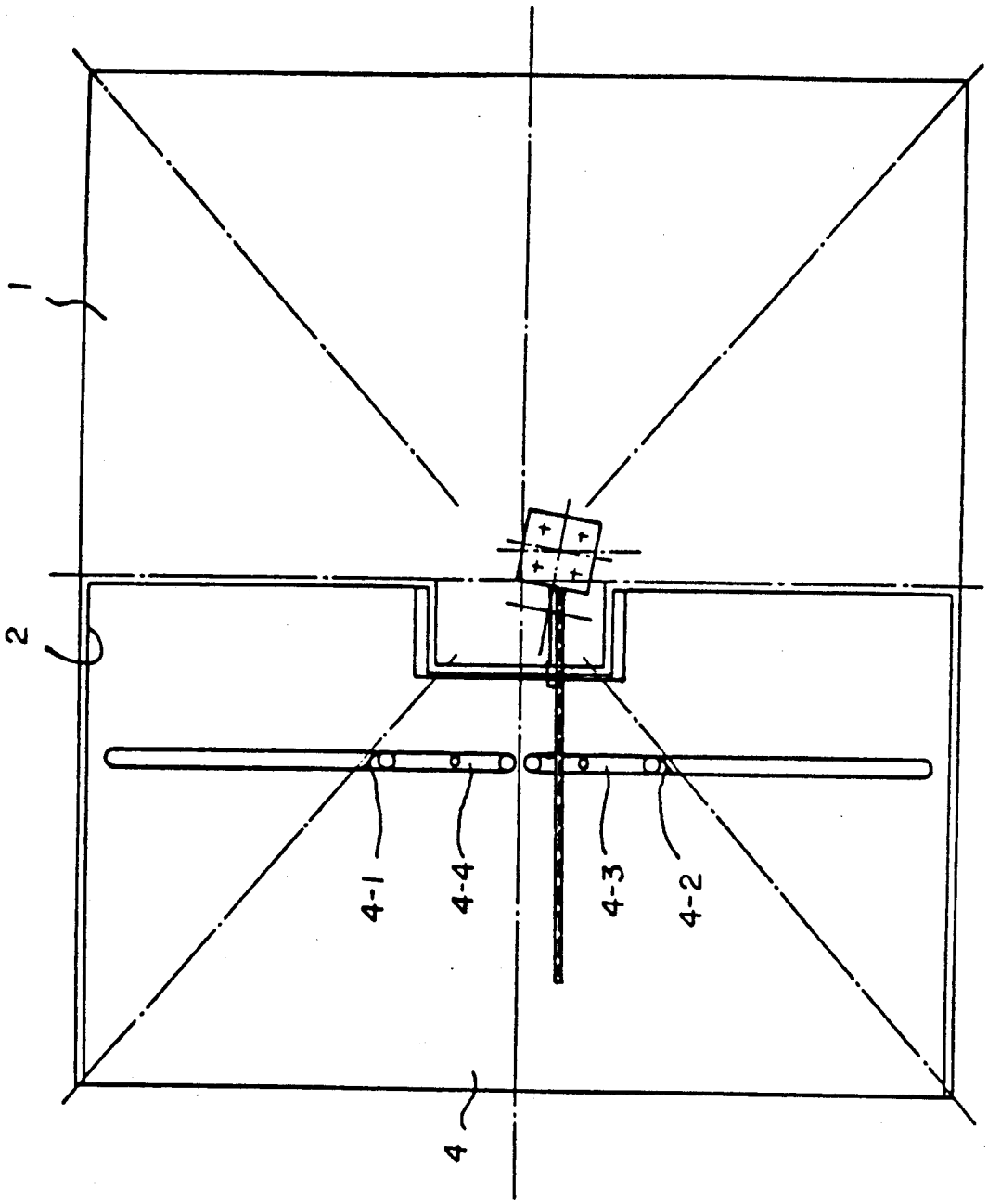
FIG. 3 is a view similar to FIG. 2 with the front portion of a cover removed.

In FIG. 3, the front half of cover 1 is removed to reveal the substantially rectangular front main end panel 4. Each main end panel has a pair of corner end panel grooves 4-3 and 4-4 which extend transversely to the end direction of movement for the main end panel 4. The front main and corner end panels are mounted on the upper surface of a middle frame 2, partially shown in FIG. 3.

Figure 4:
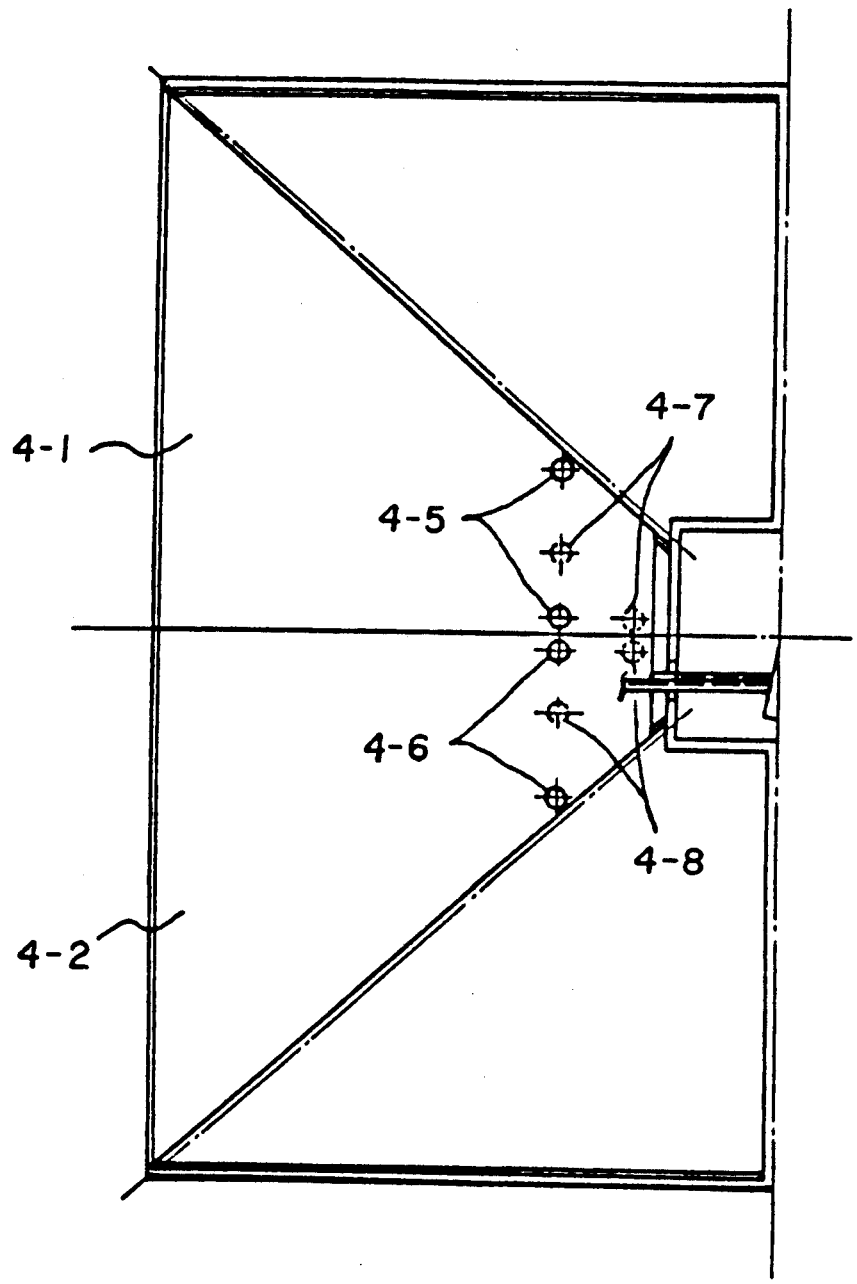
FIG. 4 is a view similar to FIG. 3, showing the front portion of the blind only and with a main end panel of the blind removed.

FIG. 4 shows the substantially triangular corner end panels, 4-1 and 4-2 which carry upper rollers 4-5 and 4-6 that are slidably engaged within respective grooves 4-3 and 4-4 of the main end panel 4. Each corner panel 4-1 and 4-2 also carries a pair of rollers 4-7 and 4-8 which extend from the lower surface of the corner panels.

Figure 5:
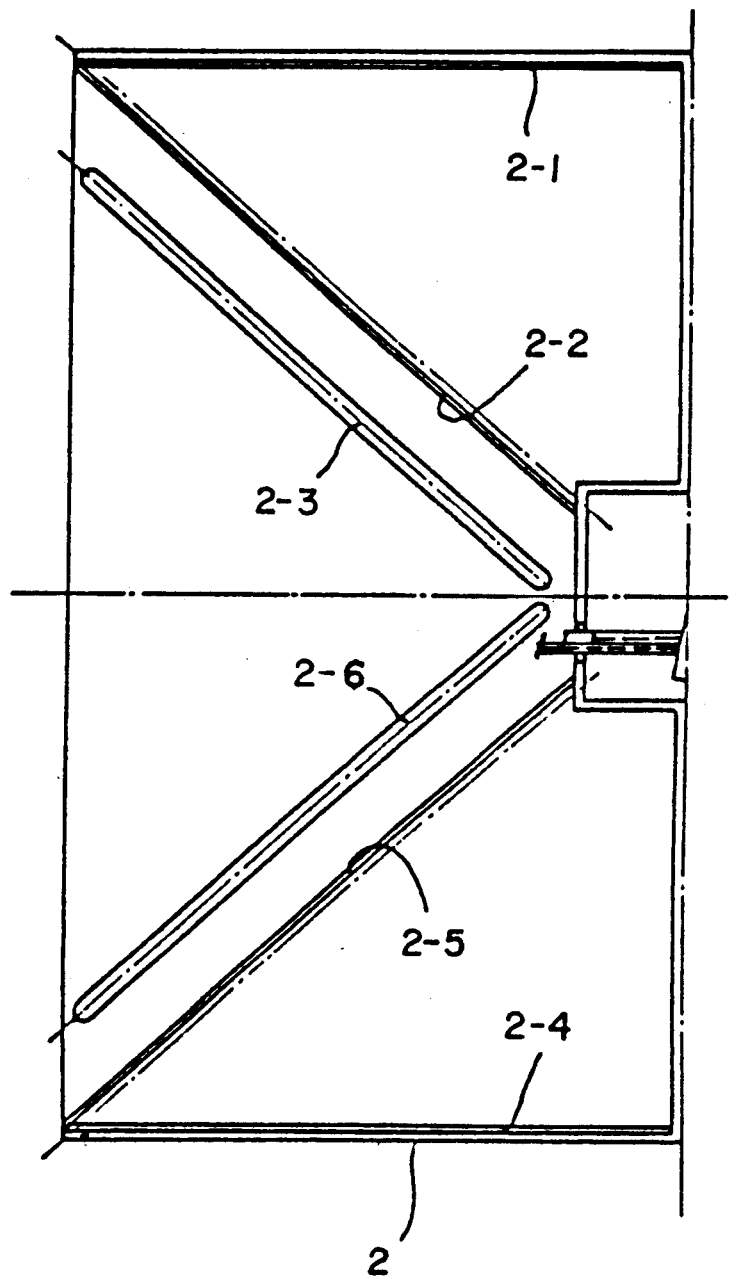
FIG. 5 is a view similar to FIG. 4 showing the front half of a main frame of the blind, with the main and corner end panels removed.

FIG. 5 shows the upper surface of the front half of the middle frame 2 with all panels removed. Middle frame 2 has roller guide grooves 2-3 and 2-6 which extend at respective opposite acute angles with respect to the end direction. The rollers 4-7 and 4-8 of respective corner panels ride in respective grooves 2-3 and 2-6. Middle frame 2 also carries a trough shaped main end panel guide having edges 2-1 and 2-4 which slidably receive the front main panel for forward sliding movement with respect to middle frame 2.

Figure 6:
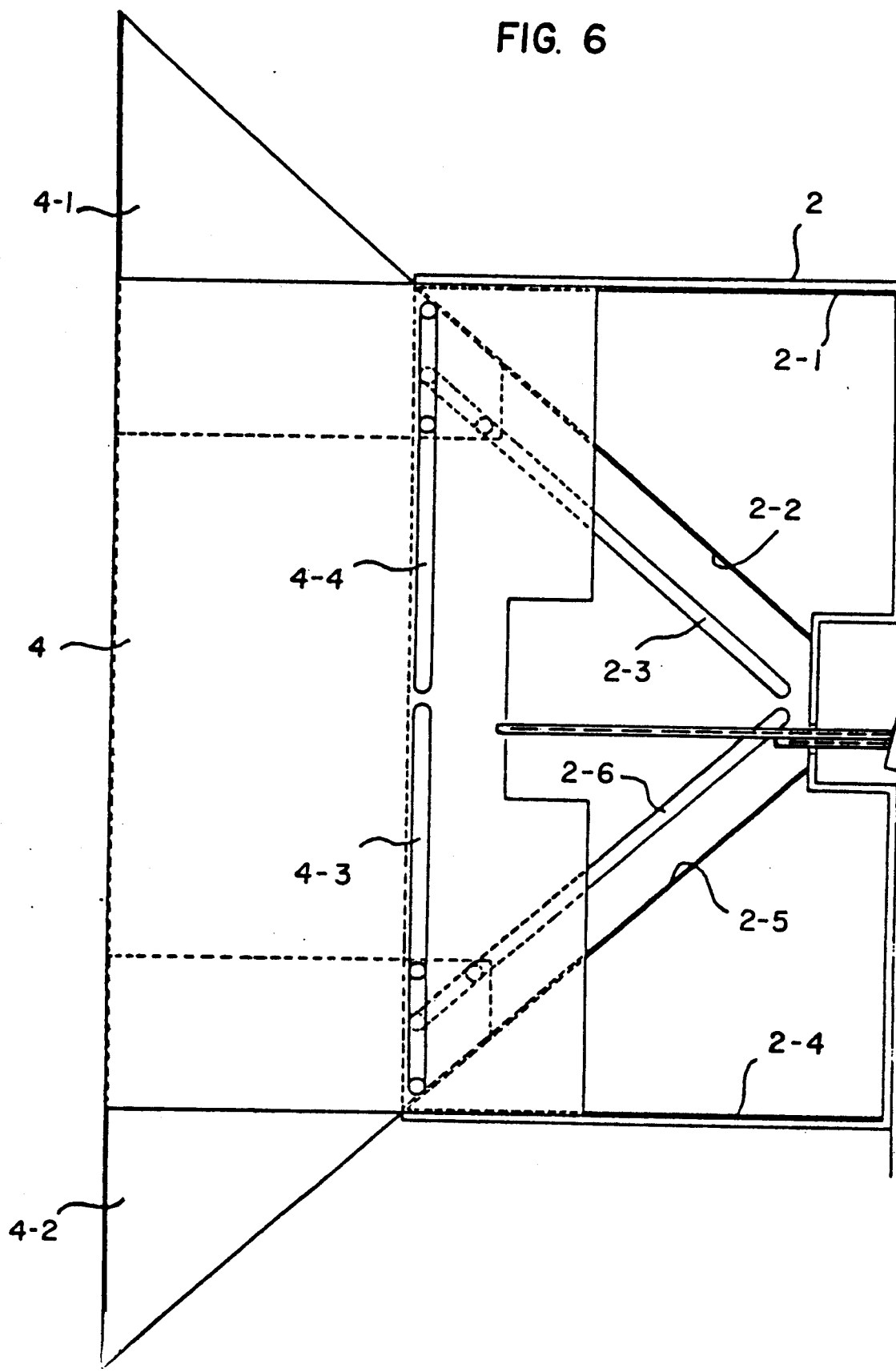
FIG. 6 is a view similar to FIG. 5 with the main and corner end panels present and fully extended.

FIG. 6 shows the fully extended position of end panels 4-1, 4 and 4-2. To bring the panels to this position, the drive which has an arm connected to an inner edge of main end panel 4, moves the main end panel 4 in the forward direction which is to the left in FIG. 6. This movement is guided by guides 2-1 and 2-4. Corner panels 4-1 and 4-2 are simultaneously moved forwarded and outwardly at acute angles by virtue of their upper rollers which guide in grooves 4-4 and 4-3 (to cause the corner panels 4-1 and 4-2 to spread outwardly of each other) and the lower rollers of corner panels 4-1 and 4-2 which ride along the grooves 2-3 and 2-6 in the middle frame 2, causing the corner panels to move at an acute angle outwardly from each other. To help guide the movement of corner panels 4-1 and 4-2 along their acute angular paths, corner panel guides 2-2 and 2-5 are provided on the upper surface of middle frame 2.

Figure 7:
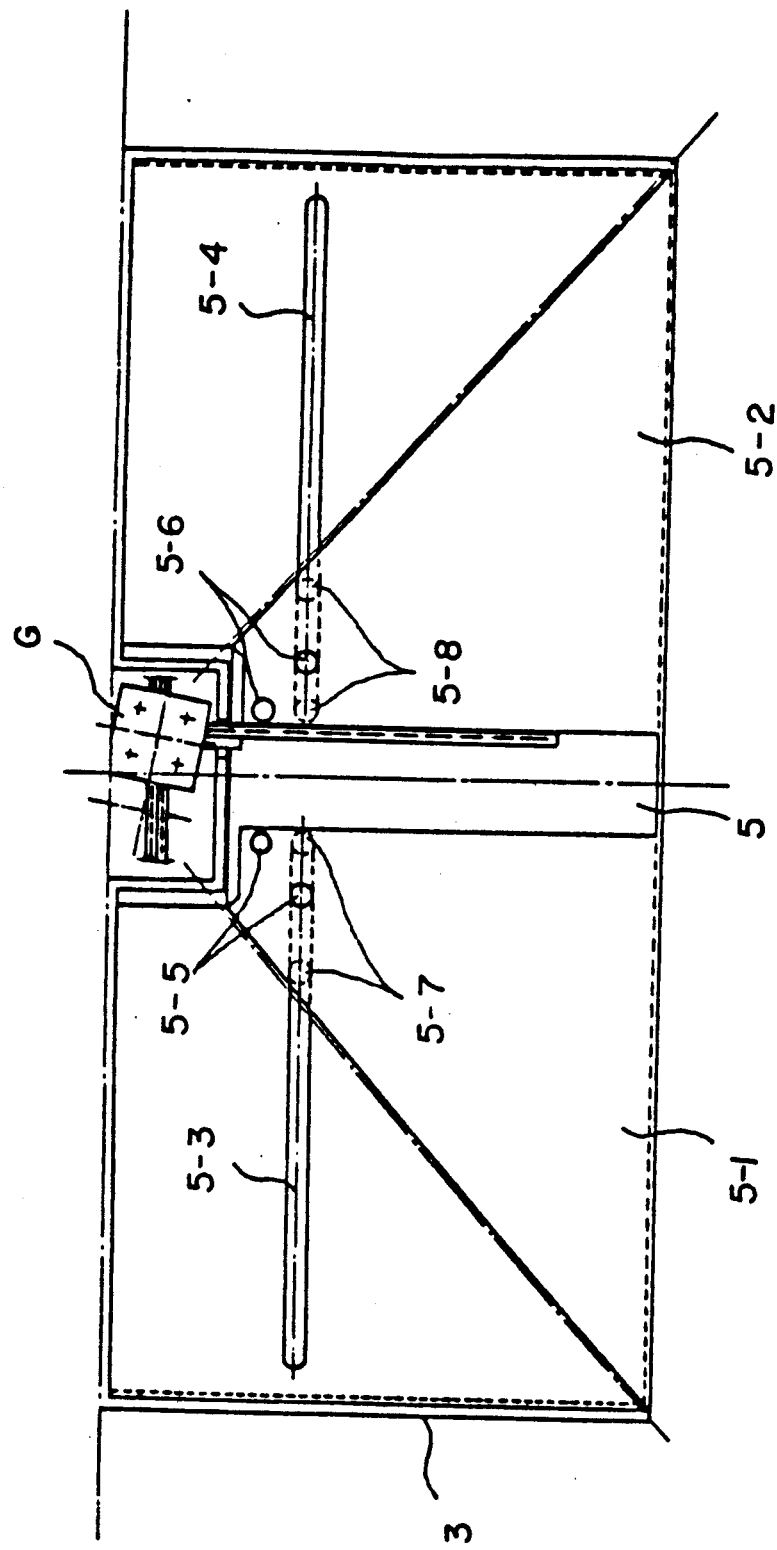
FIG. 7 is a top plan view of the left hand half of the sun blind, with all end panels and the middle frame removed to expose main and corner side panels which are provided on a base of the blind, and which are in their retracted position.

FIG. 7 shows the arrangement of a left hand main side panel 5 which is mounted on the surface of a base 3. Main side panel 5 carries a pair of grooves 5-3 and 5-4 which extend transversely to a side direction of movement for the side panel 5. The side direction in FIG. 7 is downwardly. Grooves 5-3 and 5-4 also extend parallel to the end directions (that is to the front and to the rear) of the sun blind.

Corner side panels 5-1 and 5-2 which are substantially triangular in shape are shown on main side panel 5 in the fully retracted position of all panels. Each corner panel 5-1 and 5-2 carries a pair of upper rollers 5-5 and 5-6 which ride in respective grooves in the middle frame (not shown in FIG. 7). Each corner panel 5-1 and 5-2 also carries a pair of lower rollers 5-7 and 5-8 which are engaged in and slidable ride along the respective grooves 5-3 and 5-4.

Figure 8:
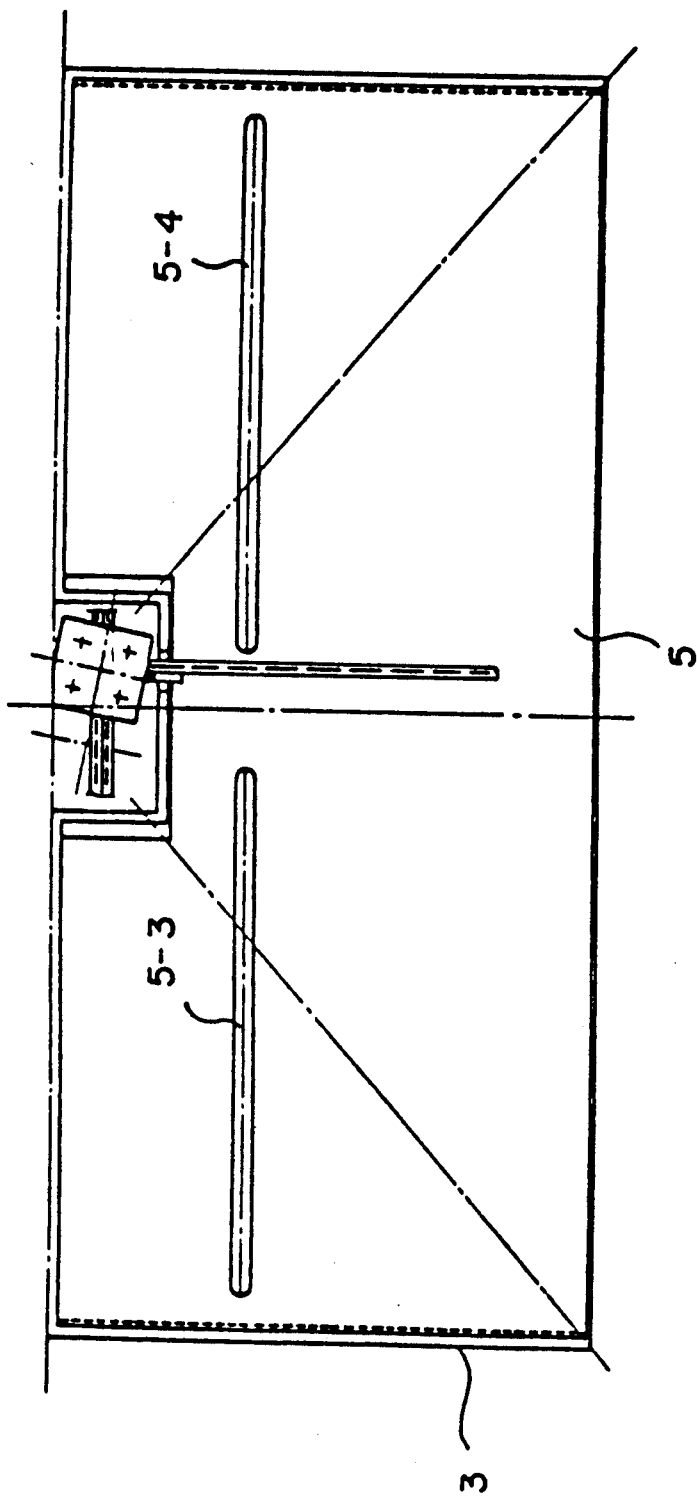
FIG. 8 is a view similar to FIG. 7 with the corner side panels removed.

FIG. 8 shows the main side panel 5 with the corner panels removed.

Figure 9:
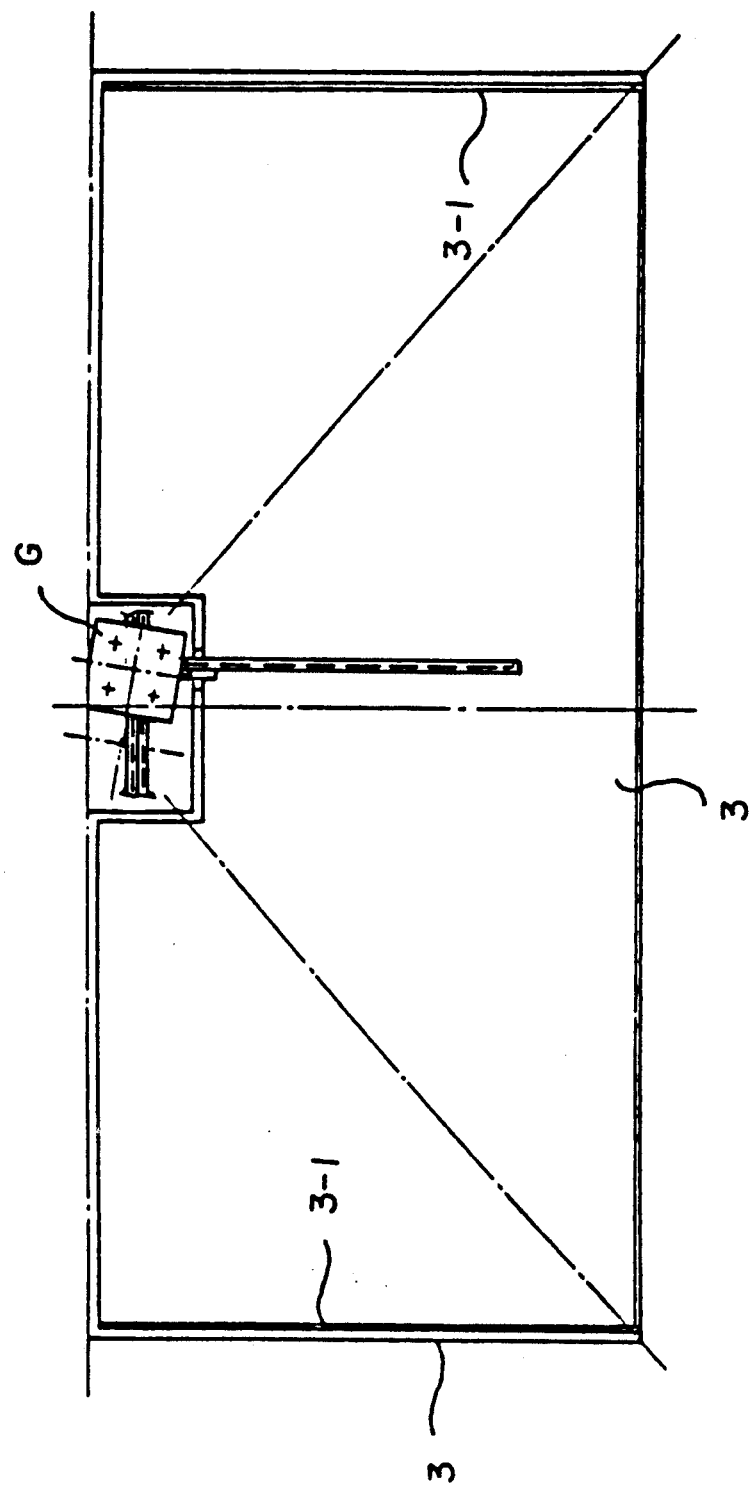
FIG. 9 is a view similar to FIG. 8 with the corner and main side panels removed to reveal the base.

FIG. 9 shows the top surface of the left hand half of base 3 with all panels removed, to reveal the guide for the side direction movement of the main side panels defined by guiding edges 3-1, 3-1.

Figure 10:
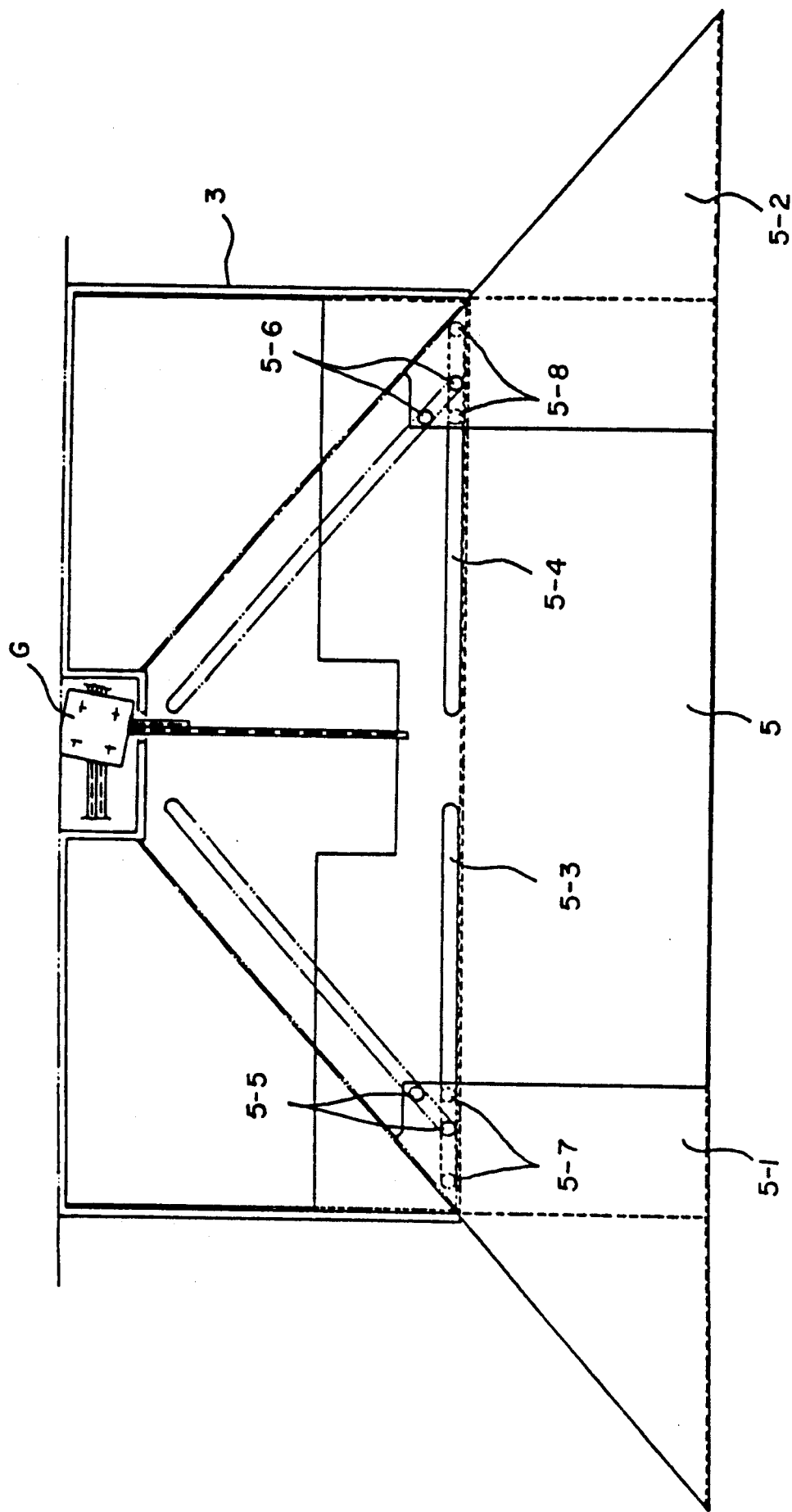
FIG. 10 is a view similar to FIG. 9 with all corner and main side panels present and fully extended.
Figure 12:
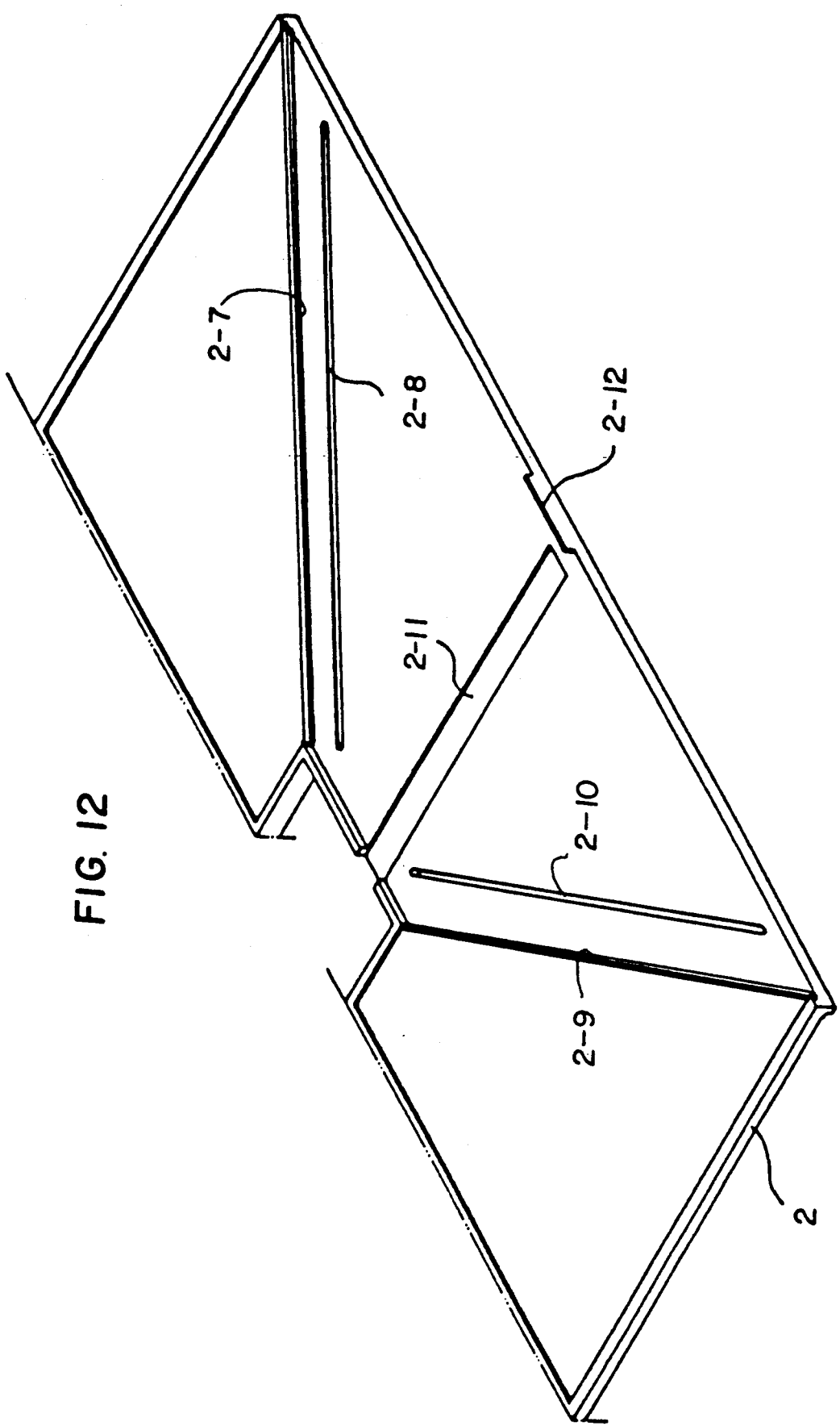
FIG. 12 is a bottom rear perspective view of the left hand half of the middle frame with all panels removed.
Figure 13:
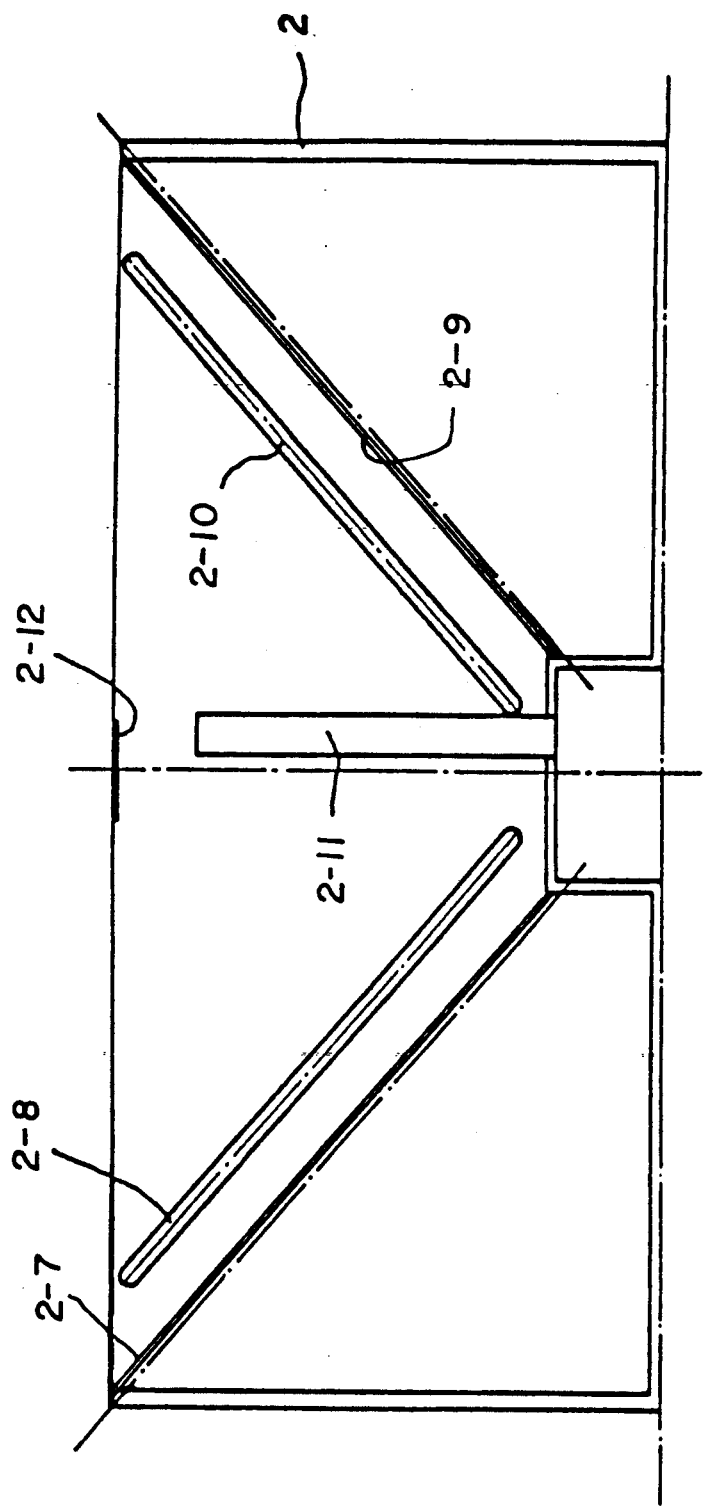
FIG. 13 is a bottom plan view of the left hand half of the middle frame with all panels removed.

FIG. 10 shows all side panels in their fully extended position. To reach this position, main side panel 5 is driven by drive means G, downwardly in FIG. 10 (in a side direction). By engagement of rollers 5-7 and 5-8 in grooves 5-3 and 5-4, this sideways movement of main panel 5 also causes movement along opposite acute angles for the corner panels 5-1 and 5-2. Movement along the acute angle is confined by rollers 5-5 and 5-6 which ride in the grooves of middle frame 2. These grooves for guiding the movement of the corner side panels are shown in FIGS. 12 and 13 at 2-8 and 2-10 respectively. The bottom surface of middle frame 2 also carries guides 2-7 and 2-9 which guide an edge of the corner side panels 5-1 and 5-2 along their path of movement at the opposite acute angles outwardly from the base, middle frame and cover.

FIGS. 12 and 13 also illustrate a projecting jaw 2-12 which is positioned to engage a step in the main side panel to limit its maximum outer position thereof, and a groove 2-11 which is dimensioned to accommodate a drive arm from the drive means G.

Figure 11:
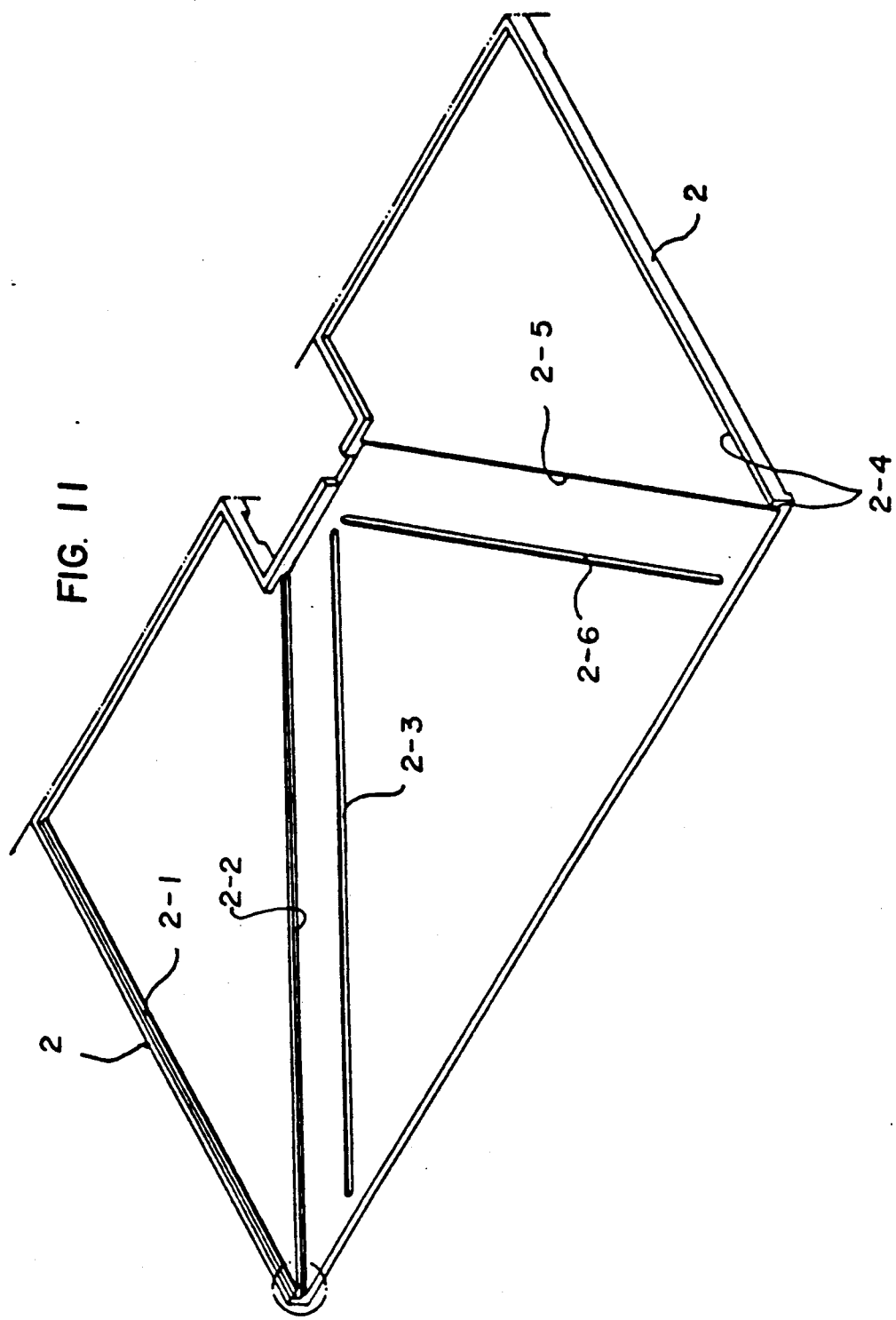
FIG. 11 is a top front perspective view of the front half of the middle frame with all panels removed.
Figure 11A:
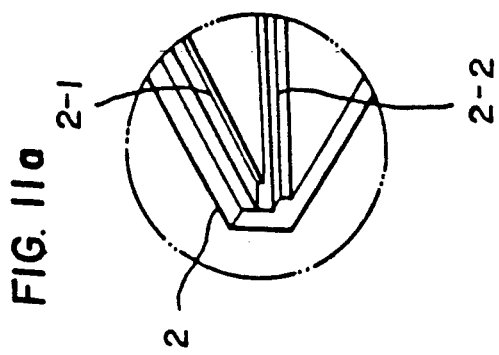
FIG. 11a is a fragmentary view, on an enlarged scale, of the corner area for the middle frame shown in FIG. 11.

FIGS. 11 and 11a better illustrate the structure for the panel guides 2-1 and 2-4 as well as the guides 2-2 and 2-5. The guides are all trough shaped and engage edges of the panels for guiding their linear movement.

Figure 14:
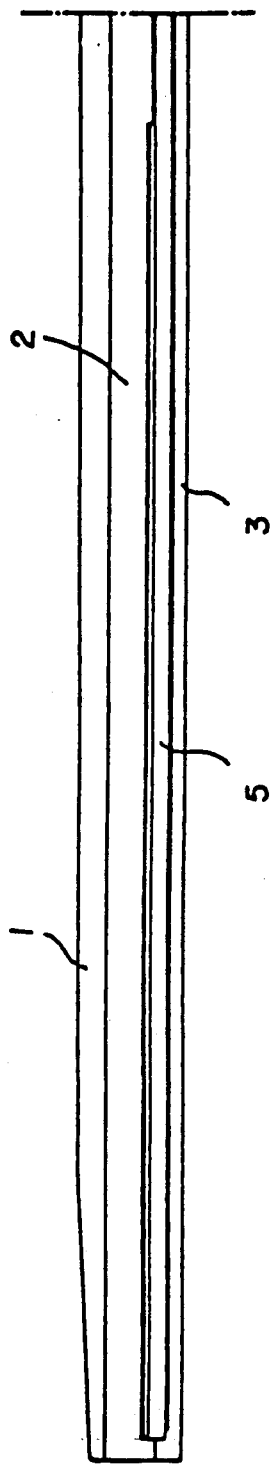
FIG. 14 is a side elevational view of the front half of the blind.

FIG. 14 shows the relative position of the base 3, the main side panel 5, the middle frame 2 and the cover 1.

Figure 15:
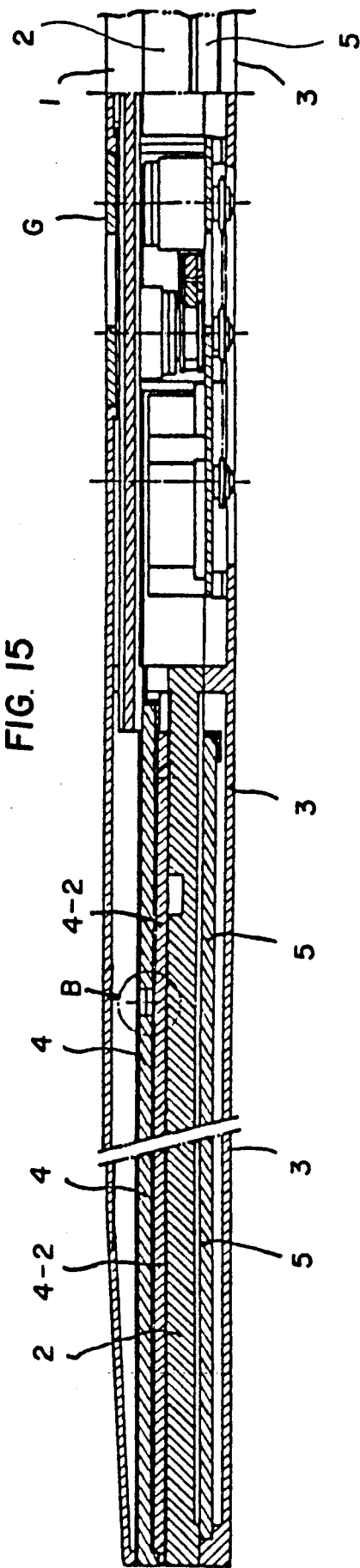
FIG. 15 is a sectional view taken along line A—A of FIG. 2.

FIG. 15 is a sectional view which shows the position of drive means G under cover 1, the end panels 4 and 4-2 which are between the cover 1 and middle frame 2, as well as a portion of the main side panel 5 which is mounted on the base 3. The corner side panel to be positioned between main panel 5 and middle frame 2 is not illustrated in FIG. 15.

Figure 16:
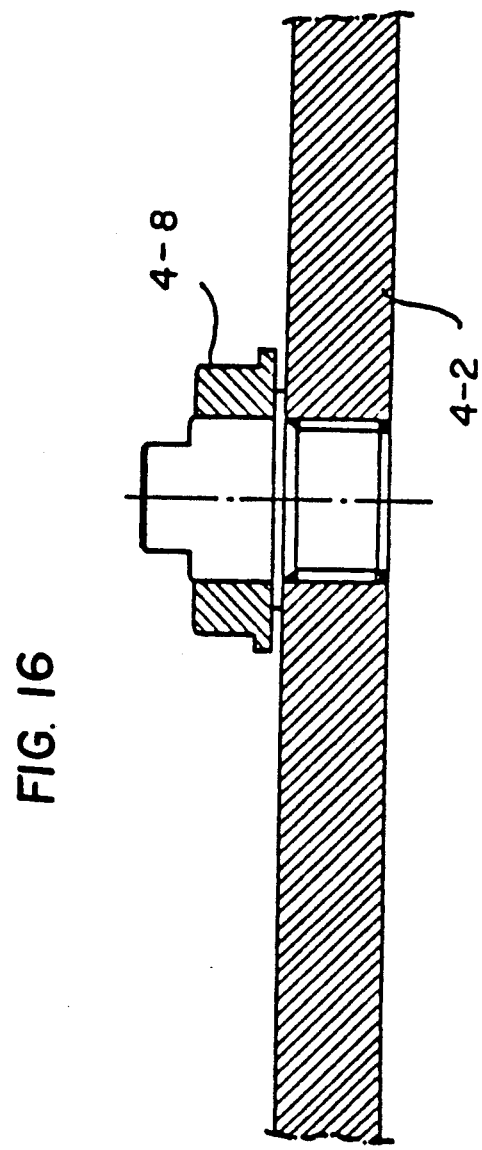
FIG. 16 is a fragmentary sectional view on an enlarged scale taken from the area within circle B in FIG. 15.

FIG. 16 shows a representative roller 4-8 which is rotatably mounted on the corner end panel 4-2.

Figure 17:
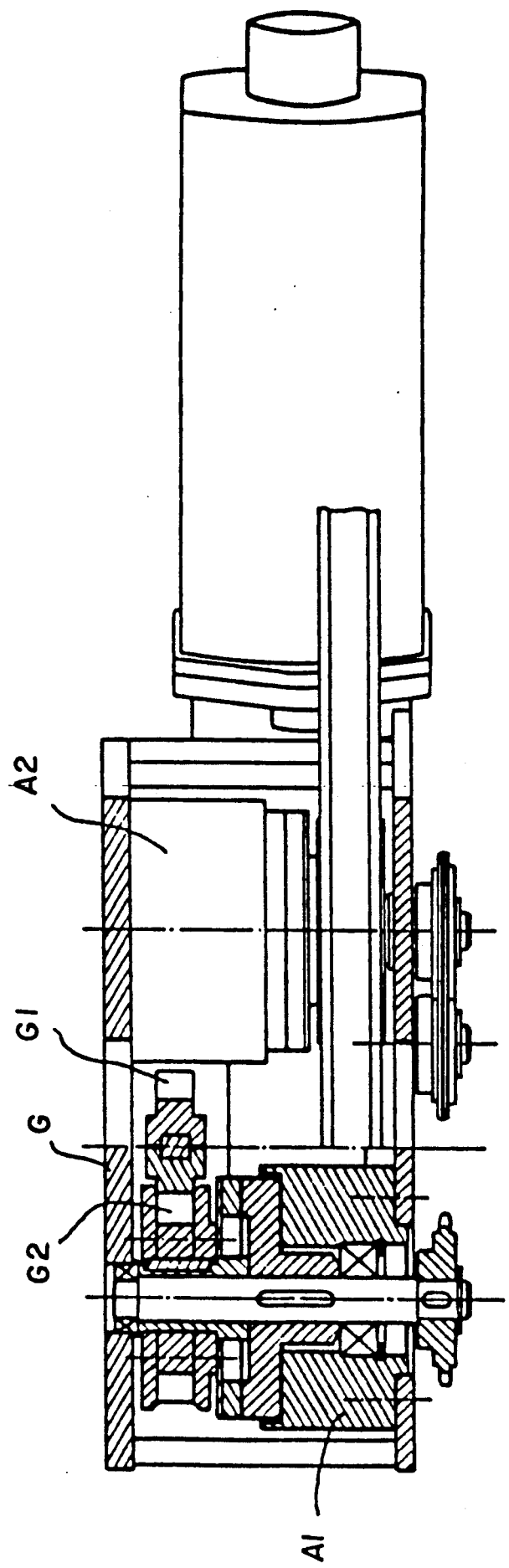
FIG. 17 is a sectional view of the drive mechanism for operating the present invention.
Figure 18:
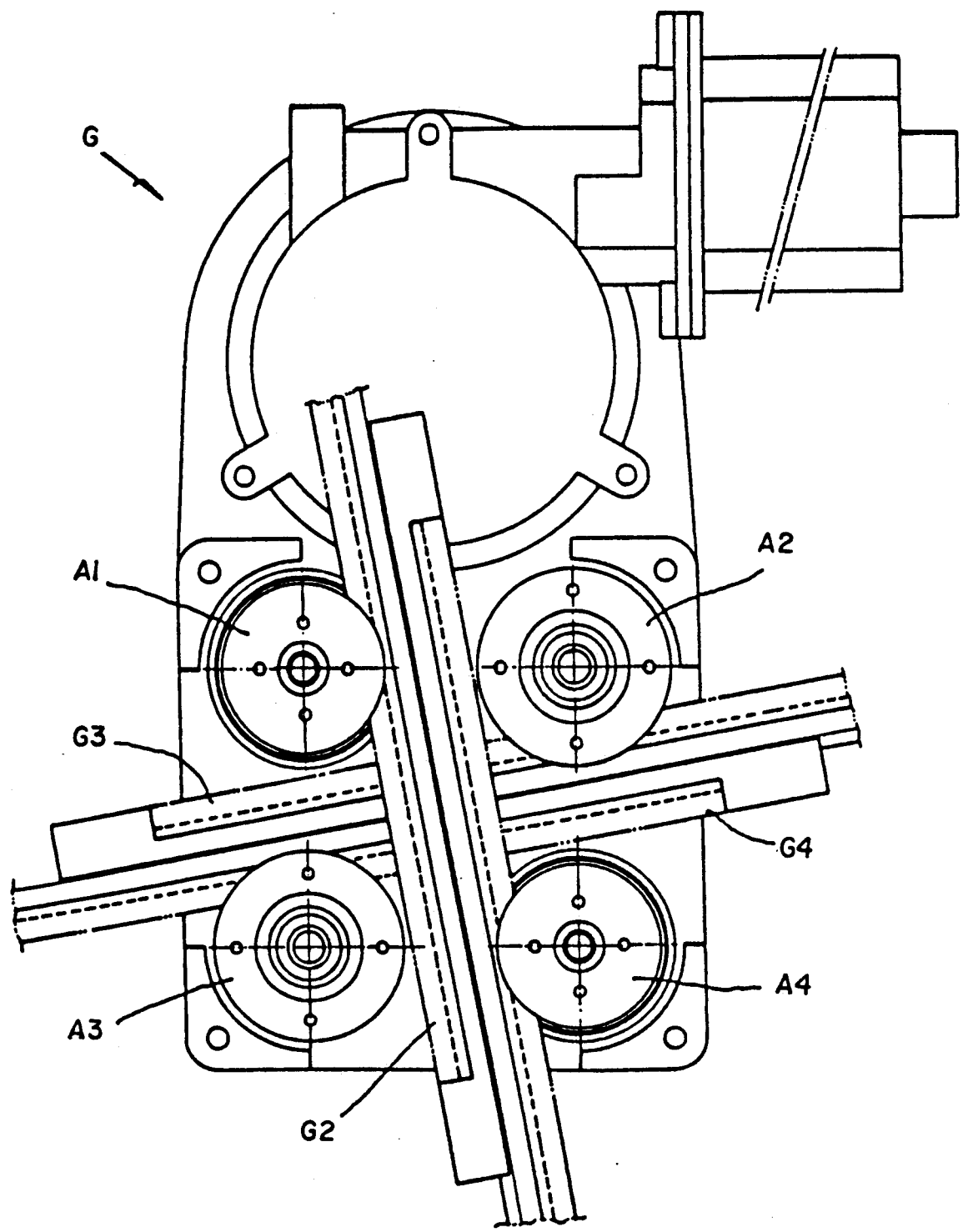
FIG. 18 is a top plan view of the drive mechanism.

FIGS. 17 and 18 illustrate the drive means G which comprises single clutch assemblies A1, A2, A3 and A4 which are rotatable to move respective rack gears G2, G3, G4 and G1, which are connected to the respective main end and side panels. The use of clutches permits the shaft of the drive motor to rotate freely without moving the panels, until the clutches are engaged for movement of the panels. The clutches are of an electrical type and engage when supplied with electric power. Rotation of the clutches causes the rack gears to move outwardly while rotation in the opposite direction causes the rack gears to move inwardly, for respectively extending and retracting the panels.

The structure of the invention is slim and thus exposes minimum surface for air resistance.

What is claimed is:

1. A sun blind for use on an automobile, comprising:
   a base (3) with opposite sides and opposite ends, said base having a pair of main side panel guides (3-1), one on each side of said base, extending in a side direction;
   a main side panel (5) slidably mounted to each main side panel guide for movement in the side direction, each main side panel having a pair of corner side panel grooves (5-3, 5-4) therein, extending transversely to the side direction;
   a pair of corner side panels (5-1, 5-2) for each main side panel, each corner side panel having at least one upper roller (5-5, 5-6) and at least one lower roller (5-7, 5-8), said lower roller of each corner side panel being engaged within one of said corner side panel grooves;
   a middle frame (2) having opposite sides and opposite ends, said middle frame being positioned over and being connected to said base with said main side panels and said corner side panels between said middle frame and said base, said middle frame having a pair of corner side panel grooves (2-8, 2-10) on each side of said middle frame, each corner side panel groove extending at an acute angle to said side direction with the corner side panel grooves on each respective side of said middle frame extending in opposite acute angles, said upper roller of each corner side panel being engaged for guiding movement in a respective one of said corner side panel grooves so that movement in a side direction of said main side panels causes movement of said corner side panels at said acute angles, said middle frame having an upper surface with a pair of main end panel guides (2-1, 2-4), one at each end of said middle frame and each extending in an end direction, said middle frame including a pair of corner end panel grooves (2-3, 2-6) at each end thereof, said corner end panel grooves on each respective end of said middle frame extending at opposite acute angles with respect to said end direction;
   a main end panel (4) slidably mounted in each main end panel guide for movement in the end direction, each main end panel having a pair of corner end panel grooves therein extending transversely to the end direction;
   a pair of corner end panels (4-1, 4-2) for each main end panel, each corner end panel having at least one upper roller and at least one roller, said upper roller of each corner end panel being engaged for sliding along one corner end panel groove in one of said main end panels, and said lower roller of each corner end panel being engaged for movement along one of said corner end panel grooves of said middle frame for movement of said corner end panels at the acute angles of said corner end panel grooves with movement of said main end panels; and drive means connected to said main side panels and to said main end panels for movement of said main side panels in the side direction and movement of said main end panels in the end direction.

2. A sun blind according to claim 1 wherein each corner panel includes two upper and two lower rollers.

3. A sun blind according to claim 2 wherein said middle frame includes corner panel guides for guiding the movement of said corner panels at the acute angles of respective panel grooves in said middle frame for guiding a sliding movement of said corner panels at said acute angles.

4. A sun blind according to claim 3 wherein said grooves in said main side panel extend parallel to said end direction and said grooves in said main end panel extend parallel to said side direction.

5. A sun blind according to claim 1 including a cover connected to said middle frame and lying over said main and corner end panels.

* * * * *